(12) United States Patent
Zhou et al.

(10) Patent No.: US 6,973,092 B1
(45) Date of Patent: Dec. 6, 2005

(54) DYNAMIC QUEUE UTILIZATION

(75) Inventors: Fan Zhou, Petaluma, CA (US); Joseph A. Hook, Baden, PA (US); Jeff Schulz, Valencia, PA (US)

(73) Assignee: Marconi Intellectual Property (Ringfence), Inc., Warrendale, PA (US)

( * ) Notice: Subject to any disclaimer, the term of this patent is extended or adjusted under 35 U.S.C. 154(b) by 633 days.

(21) Appl. No.: 09/628,059

(22) Filed: Jul. 28, 2000

(51) Int. Cl.[7] .............................................. H04L 12/56
(52) U.S. Cl. ....................... 370/412; 370/474; 370/476
(58) Field of Search ................................ 370/412, 413, 370/415, 419, 428, 474, 476

(56) References Cited

U.S. PATENT DOCUMENTS 5,619,495 A * 4/1997 Yamanaka et al. .......... 370/413
6,473,433 B1 * 10/2002 Bianchini et al. ........... 370/412
6,851,035 B1 * 2/2005 Zhou et al. .................. 711/201

* cited by examiner

Primary Examiner—Chau Nguyen
Assistant Examiner—Joshua Kading
(74) Attorney, Agent, or Firm—Ansel M. Schwartz

(57) ABSTRACT

A switch for switching packets in a network. The switch includes port cards which send packets to and receive packets from the network. The switch includes fabrics connected to the port cards for switching portions of the packets. Each fabric has queues in which portions of packets are stored. Each queue corresponds to one of the port cards. Each fabric has a determining mechanism which determines which queue the portions of the packet should be placed in. The detecting mechanism is dynamic to reflect changes in port card quantity without any change in connection data of the packets. A method for switching packets in a network.

21 Claims, 8 Drawing Sheets

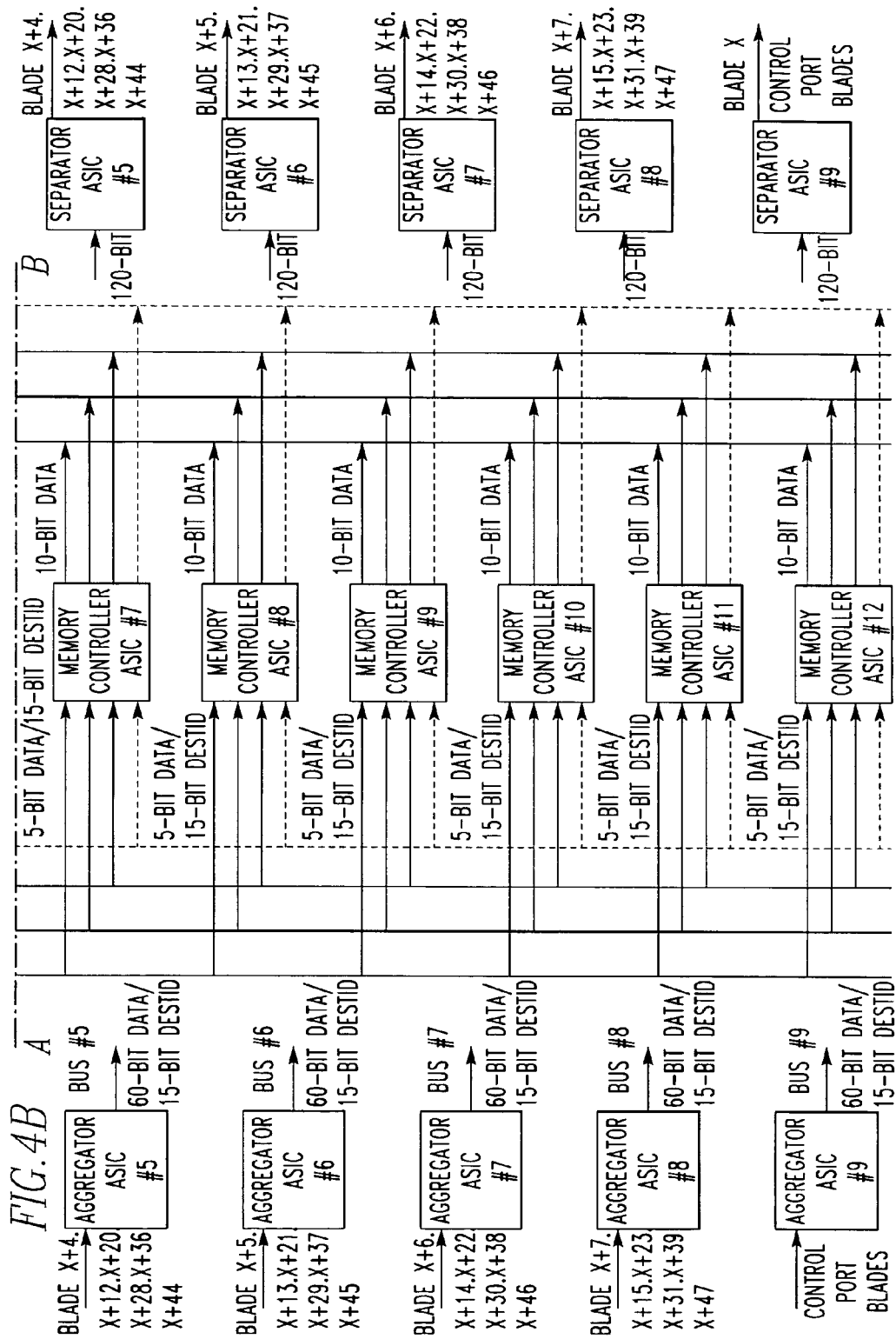

DYNAMIC QUEUE UTILIZATION

FIELD OF THE INVENTION

The present invention is related to the dynamic reconfiguration of a switch where the number of port cards change but the number of fabrics stays fixed. More specifically, the present invention is related to the dynamic reconfiguration of a switch where the number of port cards change but the number of fabrics stays fixed with an input lookup that identifies which queue packets should be placed in without having to tear down or alter any connection data structure in the packet.

BACKGROUND OF THE INVENTION

BFS is a switch if FORE Systems, Warrendale, Pa., with distributed queueing and a variable number of output ports but a fixed number of queues. If queue assignments to output ports are constant, then the number of queues which can be utilized in switch configurations with a smaller number of ports are not optimal, since a large amount of hardware resource is unused.

The present invention allows the extra hardware which would be waiting for some future expansion in switch capacity to be utilized before that capacity is installed. After the switch capacity is upgraded, then the hardware can be dynamically reallocated to support the new output ports. The process can be run in reverse if the switch capacity is downgraded. This reconfiguration can be accomplished without tearing down or altering any per connection data structure in software and guarantees ordered packet/cell delivery.

SUMMARY OF THE INVENTION

The present invention pertains to a switch for switching packets in a network. The switch comprises port cards which send packets to and receive packets from the network. The switch comprises fabrics connected to the port cards for switching portions of the packets. Each fabric has queues in which portions of packets are stored. Each queue corresponds to one of the port cards. Each fabric has a determining mechanism which determines which queue the portions of the packet should be placed in. The detecting mechanism is dynamic to reflect changes in port card quantity without any change in connection data of the packets.

The present invention pertains to a method for switching packets in a network. The method comprises the steps of receiving packets at port cards of a switch from the network. Then there is the step of sending portions of the packets as stripes to a respective number of fabrics of the switch. Next there is the step of storing the respective portions of packets in queues of the fabric corresponding to port cards the portions of the packets are to be sent to from the respective fabrics. Then there is the step of sending the portions of packets as stripes to the port card. Next there is the step of transmitting packets from the port card to the network. Then there is the step of changing the number of port cards in the switch. Next there is the step of receiving more packets at the port cards. Then there is the step of sending portions of the more packets to the number of the fabrics after the number of the fabrics has changed. Then there is the step of storing the portions of the more packets in the queues corresponding to the port cards the portions of the packets are to be sent to without any change to connection data in the packets.

BRIEF DESCRIPTION OF THE DRAWINGS

In the accompanying drawings, the preferred embodiment of the invention and preferred methods of practicing the invention are illustrated in which.

DETAILED DESCRIPTION

Figure 7:
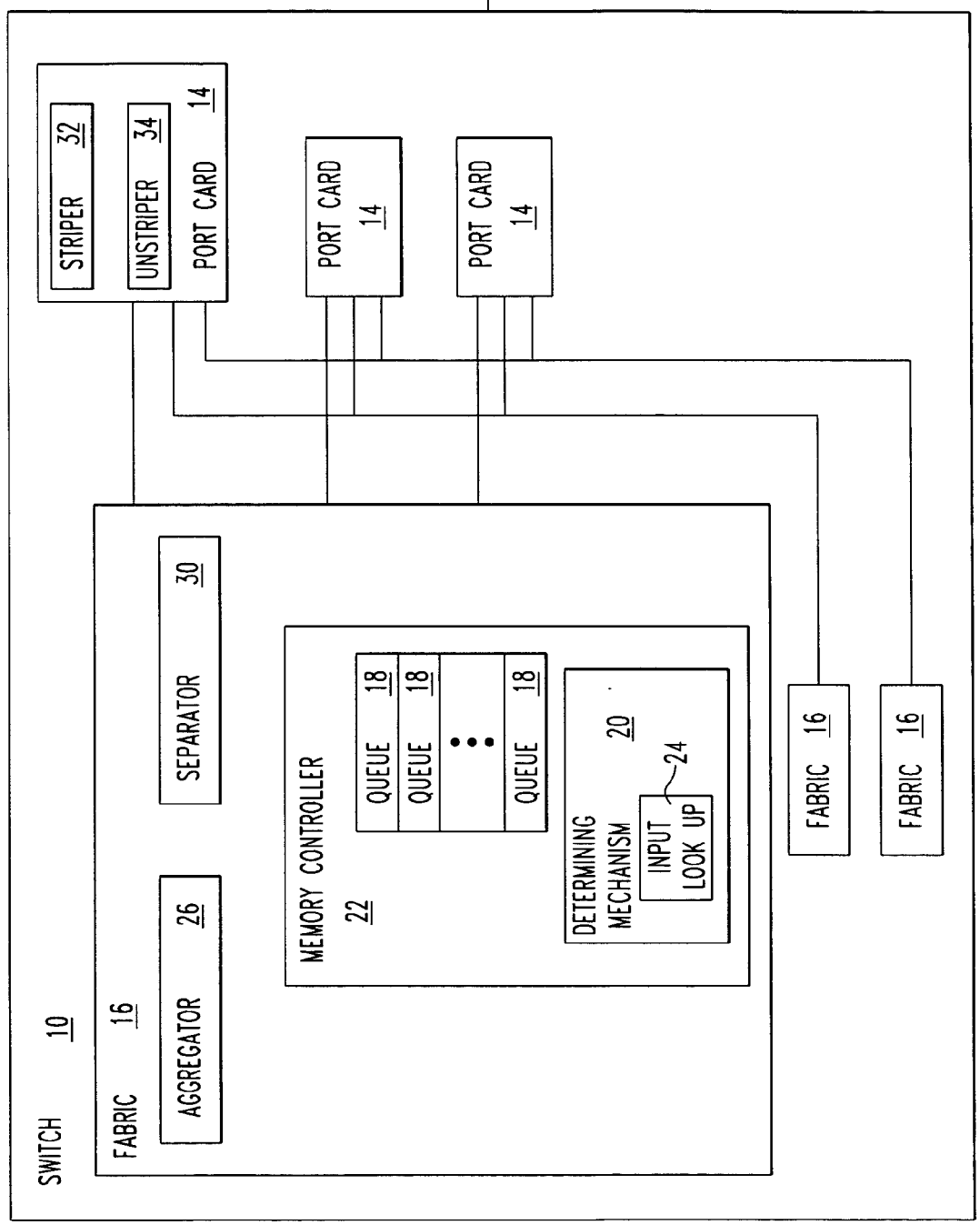
FIG. 7 is a schematic representation of a switch of the present invention.

Referring now to the drawings wherein like reference numerals refer to similar or identical parts throughout the several views, and more specifically to FIG. 7 thereof, there is shown a switch 10 for switching packets in a network 12. The switch 10 comprises port cards 14 which send packets to and receive packets from the network 12. The switch 10 comprises fabrics 16 connected to the port cards 14 for switching portions of the packets. Each fabric 16 has queues 18 in which portions of packets are stored. Each queue 18 corresponds to one of the port cards 14. Each fabric 16 has a determining mechanism 20 which determines which queue 18 the portions of the packet should be placed in. The detecting mechanism is dynamic to reflect changes in port card 14 quantity without any change in connection data of the packets.

Preferably, each fabric 16 has a memory controller 22 having the queues 18 and the detecting mechanism. The detecting mechanism preferably includes an input lookup 24 which identifies in which queue 18 portions of the packet are placed. Preferably, the input lookup 24 identifies more queues 18 than are present in the switch 10. The fabric 16 preferably receives a first signal from the network 12 which identifies which queues 18 correspond to which output ports.

Preferably, the input lookup 24 has a 10-bit field. The fabric 16 preferably receives a second signal which identifies which bits of the 10-bit field are to be used to identify the queue 18 the portions of the packet are to be stored in. Preferably, the 10-bit field comprises bits 0–7 which identifies the output port to which the queue 18 connects and bits 8 and 9 identifies a priority of the portions of the packet. The second signal preferably has a 2-bit field which indicate which 8 of the 10 bits of the input lookup 24 are to be used to identify the queue 18 the portions of the packet are to be stored in. Preferably, the 8 bits of the 10 bits can be either bits 0–5, 8 and 9 which are 4 priorities on up to 64 output ports, or bits 0–6 and 8 which are 2 priorities up to 128 output ports, or bits 0–7 which are 1 priority up to 256 output ports.

The fabric 16 preferably has an aggregator 26 which receives portions of packets and connects to the memory controller 22, and a separator 30 which connects to the memory controller 22 and sends portions of the packets to the port cards 14. Preferably, the port card 14 includes a striper 32 which sends portions of packets as stripes to the aggregator 26 of each fabric 16, and an unstriper 34 which receives portions of packets as stripes from the separator 30 of each fabric 16.

The present invention pertains to a method for switching packets in a network 12. The method comprises the steps of receiving packets at port cards 14 of a switch 10 from the network 12. Then there is the step of sending portions of the packets as stripes to a respective number of fabrics 16 of the switch 10. Next there is the step of storing the respective portions of packets in queues 18 of the fabric 16 corresponding to port cards 14 the portions of the packets are to be sent to from the respective fabrics 16. Then there is the step of sending the portions of packets as stripes to the port card 14. Next there is the step of transmitting packets from the port card 14 to the network 12. Then there is the step of changing the number of port cards 14 in the switch 10. Next there is the step of receiving more packets at the port cards 14. Then there is the step of sending portions of the more packets to the number of the fabrics 16 after the number of the fabrics 16 has changed. Then there is the step of storing the portions of the more packets in the queues 18 corresponding to the port cards 14 the portions of the packets are to be sent to without any change to connection data in the packets.

Preferably, the storing step includes the step of looking up in an input lookup 24, which identifies in which queue 18 portions of the packets are placed, which queue 18 the portions of the packets are to be placed. After the changing step, there is preferably the step of receiving a first signal which identifies in which queues 18 portions of the packets are to be placed. Preferably, after the receiving the first signal step, there is the step of receiving a second signal which identifies which bits of a 10 bit field of the input lookup 24 are to be used to identify the queue 18 the portions of the packet are to be stored in.

The receiving the second signal step preferably includes the step of reviewing a 2-bit field of the second signal which indicates which 8 of the 10 bits of the input lookup 24 are to be used to identify the queue 18 the portions of the packets are to be stored in. Preferably, each fabric 16 has a memory controller 22 having the queues 18 and the sending portions of packets step includes the step of sending the stripes to an aggregator 26 of each fabric 16 which receives portions of packets and connects to the memory controller 22.

The portions step preferably includes the step of sending with a separator 30 of the fabric 16 which connects to the memory controller 22 portions of the packets as stripes to the port cards 14. Preferably, the sending portions step includes the step of sending with a striper 32 portions of packets as stripes to the aggregator 26 of each fabric 16. After the sending with the separator 30 step, there is preferably the step of receiving the stripes from the separator 30 of each fabric 16 at an unstriper 34 of each port card 14.

In the operation of the invention, the switch 10 has an input lookup 24 which identifies a shared memory queue 18 which the traffic should be placed in. The queue 18 identifier identifies more queues 18 than are present in the switch 10.

The format of the queue 18 identifier is a 10 bit field:
Bit 9:8—identifies the priority of the traffic
Bit 7:0—identifies the output port At the queue 18 resynch events, each memory controller 22 receives a 2 bit field which indicates the bits which should be used as the 8 bit queue 18 identified field:
9:8+5:0—4 priorities on up to 64 output ports
8+6:0—2 priorities on up to 128 output ports
7:0—1 priority on up to 256 output ports Queue 18 resynch has two important properties as it applies to changing the output queue 18 of incoming traffic.

A. All old traffic is dequeued before any new traffic is dequeued.
B. The queue resynch event is synchronous.

Property A ensures that traffic which changes queues cannot get reordered. Property B ensures that the switch 10 fabrics 16 are not thrown out of synch when the changing of the queueing is done (know all fabrics 16 will enqueue the same packet in the same queue).

The switch uses RAID techniques to increase overall switch bandwidth while minimizing individual fabric bandwidth. In the switch architecture, all data is distributed evenly across all fabrics so the switch adds bandwidth by adding fabrics and the fabric need not increase its bandwidth capacity as the switch increases bandwidth capacity.

Each fabric provides 40 G of switching bandwidth and the system supports 1, 2, 3, 4, 6, or 12 fabrics, exclusive of the redundant/spare fabric. In other words, the switch can be a 40 G, 80 G, 120 G, 160 G, 240 G, or 480 G switch depending on how many fabrics are installed.

A portcard provides 10 G of port bandwidth. For every 4 portcards, there needs to be 1 fabric. The switch architecture does not support arbitrary installations of portcards and fabrics.

The fabric ASICs support both cells and packets. As a whole, the switch takes a "receiver make right" approach where the egress path on ATM blades must segment frames to cells and the egress path on frame blades must perform reassembly of cells into packets.

There are currently eight switch ASICs that are used in the switch:

A. Striper—The Striper resides on the portcard and SCP-IM. It formats the data into a 12 bit data stream, appends a checkword, splits the data stream across the N, non-spare fabrics in the system, generates a parity stripe of width equal to the stripes going to the other fabric, and sends the N+1 data streams out to the backplane.

B. Unstriper—The Unstriper is the other portcard ASIC in the the switch architecture. It receives data stripes from all the fabrics in the system. It then reconstructs the original data stream using the checkword and parity stripe to perform error detection and correction.

C. Aggregator—The Aggregator takes the data streams and routewords from the Stripers and multiplexes them into a single input stream to the Memory Controller.

D. Memory Controller—The Memory controller implements the queueing and dequeueing mechanisms of the switch. This includes the proprietary wide memory interface to achieve the simultaneous en-/de-queueing of multiple cells of data per clock cycle. The dequeueing side of the Memory Controller runs at 80 Gbps compared to 40 Gbps in order to make the bulk of the queueing and shaping of connections occur on the portcards.

E. Separator—The Separator implements the inverse operation of the Aggregator. The data stream from the Memory Controller is demultiplexed into multiple streams of data and forwarded to the appropriate Unstriper ASIC. Included in the interface to the Unstriper is a queue and flow control handshaking.

There are 3 different views one can take of the connections between the fabric: physical, logical, and "active." Physically, the connections between the portcards and the fabrics are all gigabit speed differential pair serial links. This is strictly an implementation issue to reduce the number of signals going over the backplane. The "active" perspective looks at a single switch configuration, or it may be thought of as a snapshot of how data is being processed at a given moment. The interface between the fabric ASIC on the portcards and the fabrics is effectively 12 bits wide. Those 12 bits are evenly distributed ("striped") across 1, 2, 3, 4, 6, or 12 fabrics based on how the fabric ASICs are configured. The "active" perspective refers to the number of bits being processed by each fabric in the current configuration which is exactly 12 divided by the number of fabrics.

The logical perspective can be viewed as the union or max function of all the possible active configurations. Fabric slot #1 can, depending on configuration, be processing 12, 6, 4, 3, 2, or 1 bits of the data from a single Striper and is therefore drawn with a 12 bit bus. In contrast, fabric slot #3 can only be used to process 4, 3, 2, or 1 bits from a single Striper and is therefore drawn with a 4 bit bus.

Unlike previous switches, the switch really doesn't have a concept of a software controllable fabric redundancy mode. The fabric ASICs implement N+1 redundancy without any intervention as long as the spare fabric is installed.

As far as what does it provide; N+1 redundancy means that the hardware will automatically detect and correct a single failure without the loss of any data.

The way the redundancy works is fairly simple, but to make it even simpler to understand a specific case of a 120 G switch is used which has 3 fabrics (A, B, and C) plus a spare (S). The Striper takes the 12 bit bus and first generates a checkword which gets appended to the data unit (cell or frame). The data unit and checkword are then split into a 4-bit-per-clock-cycle data stripe for each of the A, B, and C fabrics ($A_3A_2A_1A_0$, $B_3B_2B_1B_0$, and $C_3C_2C_1C_0$). These stripes are then used to produce the stripe for the spare fabric $S_3S_2S_1S_0$ where $S_n = A_n$ XOR $B_n$ XOR $C_n$ and these 4 stripes are sent to their corresponding fabrics. On the other side of the fabrics, the Unstriper receives 4 4-bit stripes from A, B, C, and S. All possible combinations of 3 fabrics (ABC, ABS, ASC, and SBC) are then used to reconstruct a "tentative" 12-bit data stream. A checkword is then calculated for each of the 4 tentative streams and the calculated checkword compared to the checkword at the end of the data unit. If no error occurred in transit, then all 4 streams will have checkword matches and the ABC stream will be forwarded to the Unstriper output. If a (single) error occurred, only one checkword match will exist and the stream with the match will be forwarded off chip and the Unstriper will identify the faulty fabric stripe.

For different switch configurations, i.e. 1, 2, 4, 6, or 12 fabrics, the algorithm is the same but the stripe width changes.

If 2 fabrics fail, all data running through the switch will almost certainly be corrupted.

The fabric slots are numbered and must be populated in ascending order. Also, the spare fabric is a specific slot so populating fabric slots 1, 2, 3, and 4 is different than populating fabric slots 1, 2, 3, and the spare. The former is a 160 G switch without redundancy and the latter is 120 G with redundancy.

Firstly, the ASICs are constructed and the backplane connected such that the use of a certain portcard slots requires there to be at least a certain minimum number of fabrics installed, not including the spare. This relationship is shown in Table 0.

In addition, the APS redundancy within the switch is limited to specifically paired portcards. Portcards 1 and 2 are paired, 3 and 4 are paired, and so on through portcards 47 and 48. This means that if APS redundancy is required, the paired slots must be populated together.

To give a simple example, take a configuration with 2 portcards and only 1 fabric. If the user does not want to use APS redundancy, then the 2 portcards can be installed in any two of portcard slots 1 through 4. If APS redundancy is desired, then the two portcards must be installed either in slots 1 and 2 or slots 3 and 4.

TABLE 0

Fabric Requirements for Portcard Slot Usage

| Portcard Slot | Minimum # of Fabrics |
|---|---|
| 1–4 | 1 |
| 5–8 | 2 |
| 9–12 | 3 |
| 13–16 | 4 |
| 17–24 | 6 |
| 25–48 | 12 |

To add capacity, add the new fabric(s), wait for the switch to recognize the change and reconfigure the system to stripe across the new number of fabrics. Install the new portcards.

Note that it is not technically necessary to have the full 4 portcards per fabric. The switch will work properly with 3 fabrics installed and a single portcard in slot 12. This isn't cost efficient but it will work.

To remove capacity, reverse the adding capacity procedure.

If the switch is oversubscribed, i.e. install 8 portcards and only one fabric.

It should only come about as the result of improperly upgrading the switch or a system failure of some sort. The reality is that one of two things will occur, depending on how this situation arises. If the switch is configured as a 40 G switch and the portcards are added before the fabric, then the $5^{th}$ through $8^{th}$ portcards will be dead. If the switch is configured as 80 G non-redundant switch and the second fabric fails or is removed then all data through the switch will be corrupted (assuming the spare fabric is not installed). And just to be complete, if 8 portcards were installed in an 80 G redundant switch and the second fabric failed or was removed, then the switch would continue to operate normally with the spare covering for the failed/removed fabric.

Figure 1:
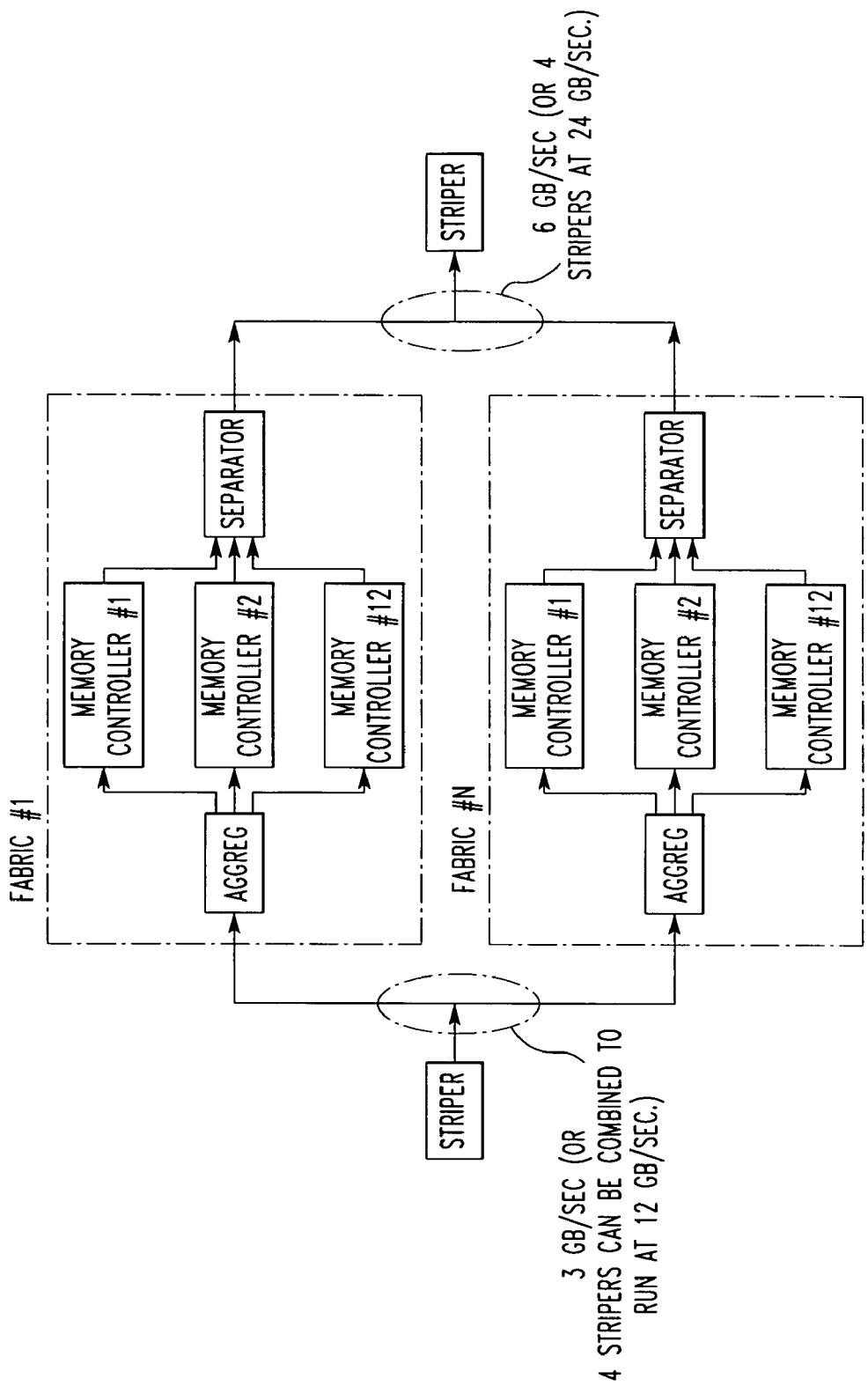
FIG. 1 is a schematic representation of packet striping in the switch of the present invention.

FIG. 1 shows packet striping in the switch.

The chipset supports ATM and POS port cards in both OC48 and OC192c configurations. OC48 port cards interface to the switching fabrics with four separate OC48 flows. OC192 port cards logically combine the 4 channels into a 10 G stream. The ingress side of a port card does not perform traffic conversions for traffic changing between ATM cells and packets. Whichever form of traffic is received is sent to the switch fabrics. The switch fabrics will mix packets and cells and then dequeue a mix of packets and cells to the egress side of a port card.

The egress side of the port is responsible for converting the traffic to the appropriate format for the output port. This convention is referred to in the context of the switch as "receiver makes right". A cell blade is responsible for segmentation of packets and a cell blade is responsible for reassembly of cells into packets. To support fabric speed-up, the egress side of the port card supports a link bandwidth equal to twice the inbound side of the port card.

Figure 2:
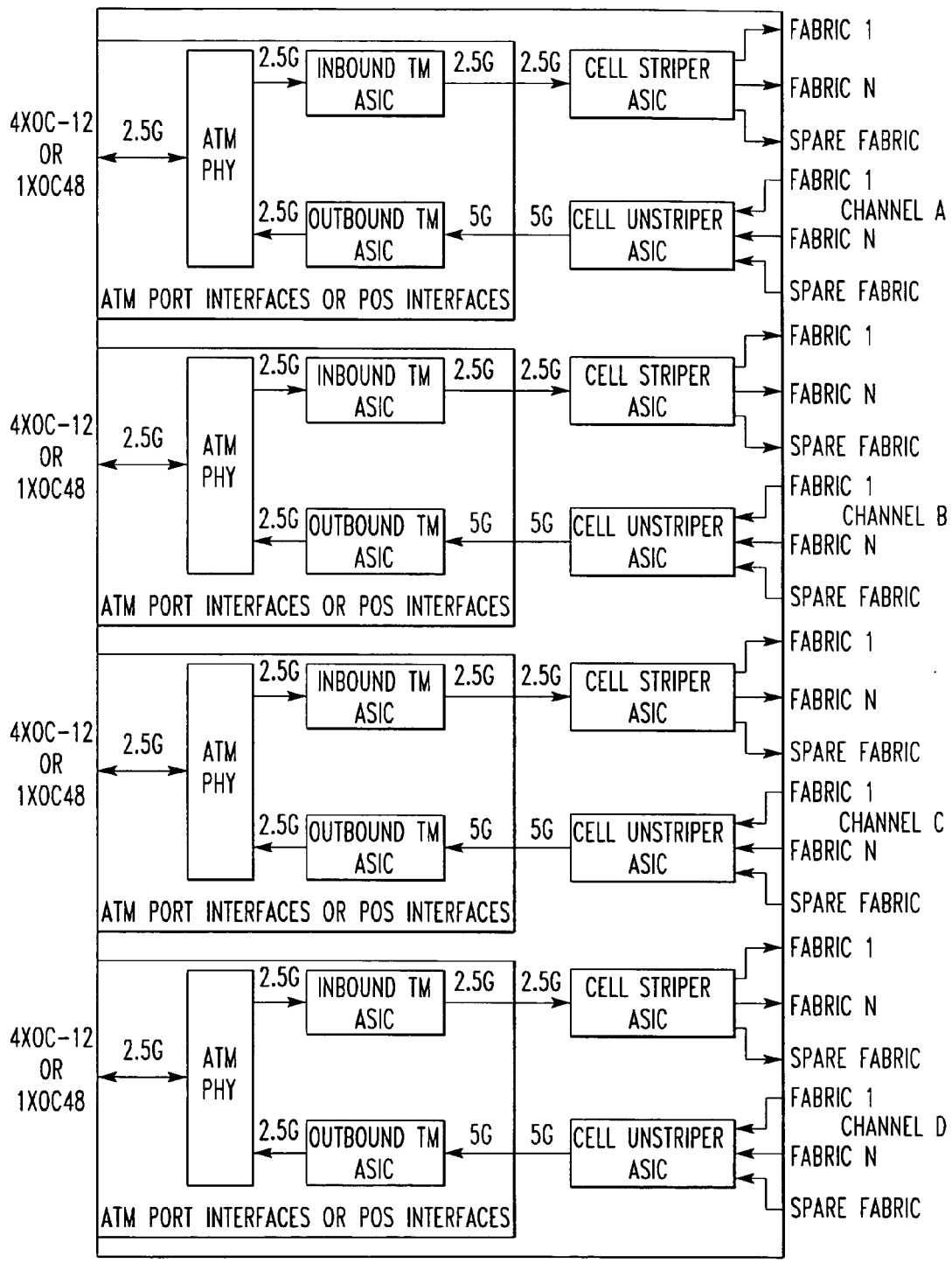
FIG. 2 is a schematic representation of an OC 48 port card.

The block diagram for a Poseidon-based ATM port card is shown as in FIG. 2. Each 2.5 G channel consists of 4 ASICs: Inbound TM and striper ASIC at the inbound side and unstriper ASIC and outbound TM ASIC at the outbound side.

At the inbound side, OC-48c or 4 OC-12c interfaces are aggregated. Each vortex sends a 2.5 G cell stream into a dedicated striper ASIC (using the BIB bus, as described below). The striper converts the supplied routeword into two pieces. A portion of the routeword is passed to the fabric to determine the output port(s) for the cell. The entire routeword is also passed on the data portion of the bus as a routeword for use by the outbound memory controller. The first routeword is termed the "fabric routeword". The routeword for the outbound memory controller is the "egress routeword".

At the outbound side, the unstriper ASIC in each channel takes traffic from each of the port cards, error checks and correct the data and then sends correct packets out on its output bus. The unstriper uses the data from the spare fabric and the checksum inserted by the striper to detect and correct data corruption.

FIG. 2 shows an OC48 Port Card.

The OC192 port card supports a single 10 G stream to the fabric and between a 10 G and 20 G egress stream. This board also uses 4 stripers and 4 unstriper, but the 4 chips operate in parallel on a wider data bus. The data sent to each fabric is identical for both OC48 and OC192 ports so data can flow between the port types without needing special conversion functions.

Figure 3:
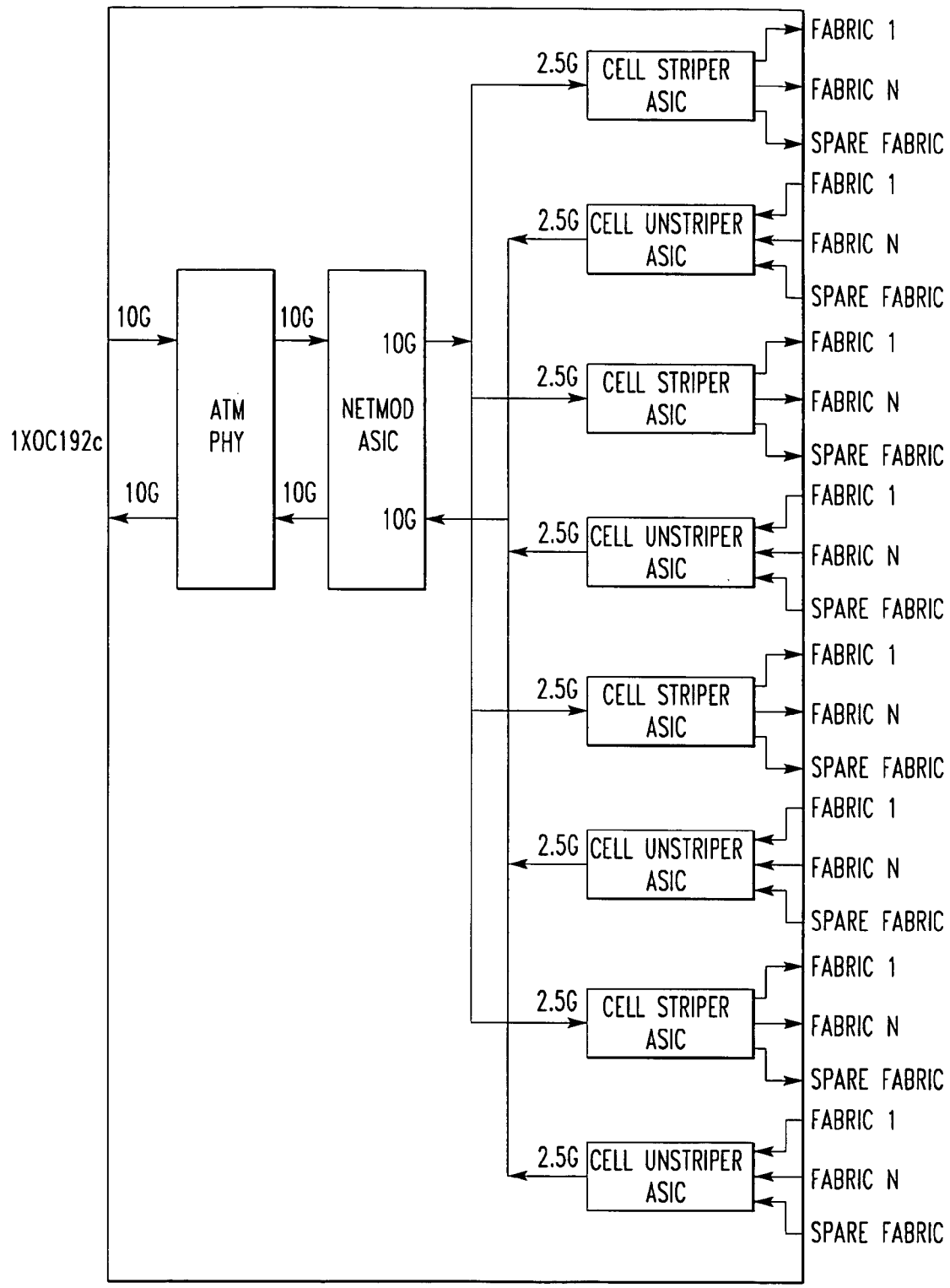
FIG. 3 is a schematic representation of a concatenated network blade.

FIG. 3 shows a 10 G concatenated network blade.

Each 40 G switch fabric enqueues up to 40 Gbps cells/frames and dequeue them at 80 Gbps. This 2× speed-up reduces the amount of traffic buffered at the fabric and lets the outbound ASIC digest bursts of traffic well above line rate. A switch fabric consists of three kinds of ASICs: aggregators, memory controllers, and separators. Nine aggregator ASICs receive 40 Gbps of traffic from up to 48 network blades and the control port. The aggregator ASICs combine the fabric route word and payload into a single data stream and TDM between its sources and places the resulting data on a wide output bus. An additional control bus (destid) is used to control how the memory controllers enqueue the data. The data stream from each aggregator ASIC then bit sliced into 12 memory controllers.

The memory controller receives up to 16 cells/frames every clock cycle. Each of 12 ASICs stores 1/12 of the aggregated data streams. It then stores the incoming data based on control information received on the destid bus. Storage of data is simplified in the memory controller to be relatively unaware of packet boundaries (cache line concept). All 12 ASICs dequeue the stored cells simultaneously at aggregated speed of 80 Gbps.

Nine separator ASICs perform the reverse function of the aggregator ASICs. Each separator receives data from all 12 memory controllers and decodes the routewords embedded in the data streams by the aggregator to find packet boundaries. Each separator ASIC then sends the data to up to 24 different unstripers depending on the exact destination indicated by the memory controller as data was being passed to the separator.

The dequeue process is back-pressure driven. If back-pressure is applied to the unstriper, that back-pressure is communicated back to the separator. The separator and memory controllers also have a back-pressure mechanism which controls when a memory controller can dequeue traffic to an output port.

In order to support OC48 and OC192 efficiently in the chipset, the 4 OC48 ports from one port card are always routed to the same aggregator and from the same separator (the port connections for the aggregator & Sep are always symmetric.). The table below shows the port connections for the aggregator & sep on each fabric for the switch configurations. Since each aggregator is accepting traffic from 10 G of ports, the addition of 40 G of switch capacity only adds ports to 4 aggregators. This leads to a differing port connection pattern for the first four aggregators from the second 4 (and also the corresponding separators).

TABLE 2

Agg/Sep port connections

| Switch Size | Agg 1 | Agg 2 | Agg 3 | Agg 4 | Agg 5 | Agg 6 | Agg 7 | Agg 8 |
|---|---|---|---|---|---|---|---|---|
| 40 | 1, 2, 3, 4 | 5, 6, 7, 8 | 9, 10, 11, 12 | 13, 14, 15, 16 | | | | |
| 80 | 1, 2, 3, 4 | 5, 6, 7, 8 | 9, 10, 11, 12 | 13, 14, 15, 16 | 17, 18, 19, 20 | 21, 22, 23, 24 | 25, 26, 27, 28 | 29, 30, 31, 32 |
| 120 | 1, 2, 3, 4 33, 34, 35, 36 | 5, 6, 7, 8 37, 38, 39, 40 | 9, 10, 11, 12, 41, 42, 43, 44 | 13, 14, 15, 16, 45, 46, 47, 48 | 17, 18, 19, 20 | 21, 22, 23, 24 | 25, 26, 27, 28 | 29, 30, 31, 32 |
| 160 | 1, 2, 3, 4 33, 34, 35, 36 | 5, 6, 7, 8 37, 38, 39, 40 | 9, 10, 11, 12, 41, 42, 43, 44 | 13, 14, 15, 16, 45, 46, 47, 48 | 17, 18, 19, 20, 49, 50, 51, 52 | 21, 22, 23, 24, 53, 54, 55, 56 | 25, 26, 27, 28, 57, 58, 59, 60 | 29, 30, 31, 32, 61, 62, 63, 64 |

Figure 4A:
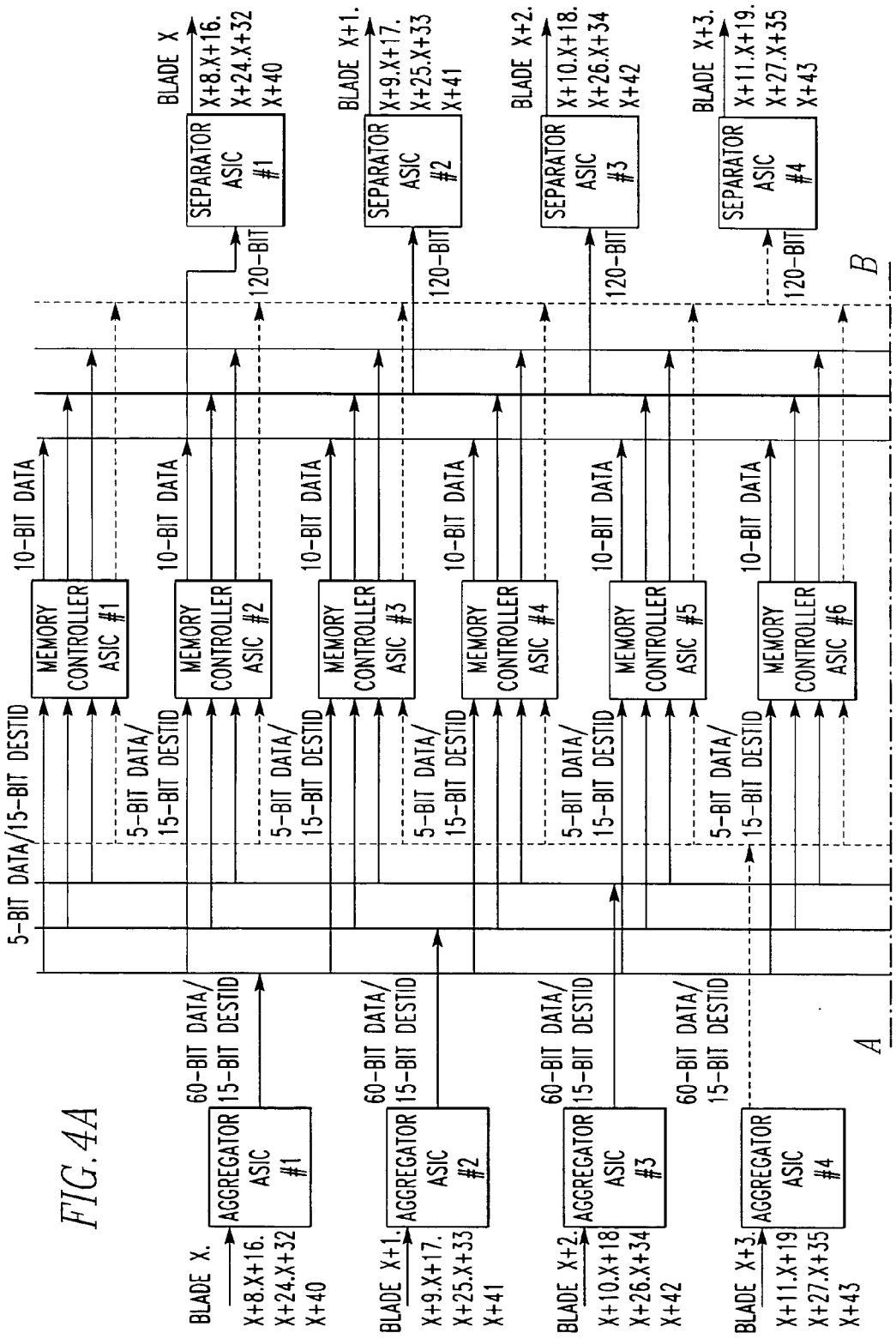
FIG. 4 is a schematic representation regarding the connectivity of the fabric ASICs.

FIG. 4 shows the connectivity of the fabric ASICs.

The external interfaces of the switches are the Input Bus (BIB) between the striper ASIC and the ingress blade ASIC such as Vortex and the Output Bus (BOB) between the unstriper ASIC and the egress blade ASIC such as Trident.

The unstriper ASIC sends data to the egress port via Output Bus (BOB) (also known as DOUT_UN_bl_ch bus), which is a 64 (or 256) bit data bus that can support either cell or packet. It consists of the following signals:

This bus can either operate as 4 separate 32 bit output buses (4×OC48c) or a single 128 bit wide data bus with a common set of control lines from all Unstripers. This bus supports either cells or packets based on software configuration of the unstriper chip.

The Synchronizer has two main purposes. The first purpose is to maintain logical cell/packet or datagram ordering across all fabrics. On the fabric ingress interface, datagrams arriving at more than one fabric from one port cards's channels need to be processed in the same order across all fabrics. The Synchronizer's second purpose is to have a port cards's egress channel re-assemble all segments or stripes of a datagram that belong together even though the datagram segments are being sent from more than one fabric and can arrive at the blade's egress inputs at different times. This mechanism needs to be maintained in a system that will have different net delays and varying amounts of clock drift between blades and fabrics.

The switch uses a system of a synchronized windows where start information is transmit around the system. Each transmitter and receiver can look at relative clock counts from the last resynch indication to synchronize data from multiple sources. The receiver will delay the receipt of data which is the first clock cycle of data in a synch period until a programmable delay after it receives the global synch indication. At this point, all data is considered to have been received simultaneously and fixed ordering is applied. Even though the delays for packet 0 and cell 0 caused them to be seen at the receivers in different orders due to delays through the box, the resulting ordering of both streams at receive time=1 is the same, Packet 0, Cell 0 based on the physical bus from which they were received.

Multiple cells or packets can be sent in one counter tick. All destinations will order all cells from the first interface before moving onto the second interface and so on. This cell synchronization technique is used on all cell interfaces. Differing resolutions are required on some interfaces.

The Synchronizer consists of two main blocks, mainly, the transmitter and receiver. The transmitter block will reside in the Striper and Separator ASICs and the receiver block will reside in the Aggregator and Unstriper ASICs. The receiver in the Aggregator will handle up to 24(6 port cards×4 channels) input lanes. The receiver in the Unstriper will handle up to 13(12 fabrics+1 parity fabric) input lanes.

When a sync pulse is received, the transmitter first calculates the number of clock cycles it is fast (denoted as N clocks).

The transmit synchronizer will interrupt the output stream and transmit N K characters indicating it is locking down. At the end of the lockdown sequence, the transmitter transmits a K character indicating that valid data will start on the next clock cycle. This next cycle valid indication is used by the receivers to synchronize traffic from all sources.

At the next end of transfer, the transmitter will then insert at least one idle on the interface. These idles allow the 10 bit decoders to correctly resynchronize to the 10 bit serial code window if they fall out of synch.

The receive synchronizer receives the global synch pulse and delays the synch pulse by a programmed number (which is programmed based on the maximum amount of transport delay a physical box can have). After delaying the synch pulse, the receiver will then consider the clock cycle immediately after the synch character to be eligible to be received. Data is then received every clock cycle until the next synch character is seen on the input stream. This data is not considered to be eligible for receipt until the delayed global synch pulse is seen.

Since transmitters and receivers will be on different physical boards and clocked by different oscillators, clock speed differences will exist between them. To bound the number of clock cycles between different transmitters and receivers, a global sync pulse is used at the system level to resynchronize all sequence counters. Each chip is programmed to ensure that under all valid clock skews, each transmitter and receiver will think that it is fast by at least one clock cycle. Each chip then waits for the appropriate number of clock cycles they are into their current sync_pulse_window. This ensure that all sources run N* sync_pulse_window valid clock cycles between synch pulses.

As an example, the synch pulse window could be programmed to 100 clocks, and the synch pulses sent out at a nominal rate of a synch pulse every 10,000 clocks. Based on a worst case drifts for both the synch pulse transmitter clocks and the synch pulse receiver clocks, there may actually be 9,995 to 10,005 clocks at the receiver for 10,000 clocks on the synch pulse transmitter. In this case, the synch pulse transmitter would be programmed to send out synch pulses every 10,006 clock cycles. The 10,006 clocks guarantees that all receivers must be in their next window. A receiver with a fast clock may have actually seen 10,012 clocks if the synch pulse transmitter has a slow clock. Since the synch pulse was received 12 clock cycles into the synch pulse window, the chip would delay for 12 clock cycles. Another receiver could seen 10,006 clocks and lock down for 6 clock cycles at the end of the synch pulse window. In both cases, each source ran 10,100 clock cycles.

When a port card or fabric is not present or has just been inserted and either of them is supposed to be driving the inputs of a receive synchronizer, the writing of data to the particular input FIFO will be inhibited since the input clock will not be present or unstable and the status of the data lines will be unknown. When the port card or fabric is inserted, software must come in and enable the input to the byte lane to allow data from that source to be enabled. Writes to the input FIFO will be enabled. It is assumed that, the enable signal will be asserted after the data, routeword and clock from the port card or fabric are stable.

At a system level, there will be a primary and secondary sync pulse transmitter residing on two separate fabrics. There will also be a sync pulse receiver on each fabric and blade. This can be seen in FIG. 5. A primary sync pulse transmitters will be a free-running sync pulse generator and a secondary sync pulse transmitter will synchronize its sync pulse to the primary. The sync pulse receivers will receive both primary and secondary sync pulses and based on an error checking algorithm, will select the correct sync pulse to forward on to the ASICs residing on that board. The sync pulse receiver will guarantee that a sync pulse is only forwarded to the rest of the board if the sync pulse from the sync pulse transmitters falls within its own sequence "0" count. For example, the sync pulse receiver and an Unstriper ASIC will both reside on the same Blade. The sync pulse receiver and the receive synchronizer in the Unstriper will be clocked from the same crystal oscillator, so no clock drift should be present between the clocks used to increment the internal sequence counters. The receive synchronizer will require that the sync pulse it receives will always reside in the "0" count window.

If the sync pulse receiver determines that the primary sync pulse transmitter is out of sync, it will switch over to the secondary sync pulse transmitter source. The secondary sync pulse transmitter will also determine that the primary sync pulse transmitter is out of sync and will start generating its own sync pulse independently of the primary sync pulse transmitter. This is the secondary sync pulse transmitter's primary mode of operation. If the sync pulse receiver determines that the primary sync pulse transmitter has become in sync once again, it will switch to the primary side. The secondary sync pulse transmitter will also determine that the primary sync pulse transmitter has become in sync once again and will switch back to a secondary mode. In the secondary mode, it will sync up its own sync pulse to the primary sync pulse. The sync pulse receiver will have less tolerance in its sync pulse filtering mechanism than the secondary sync pulse transmitter. The sync pulse receiver will switch over more quickly than the secondary sync pulse transmitter. This is done to ensure that all receiver synchronizers will have switched over to using the secondary sync pulse transmitter source before the secondary sync pulse transmitter switches over to a primary mode.

Figure 5:
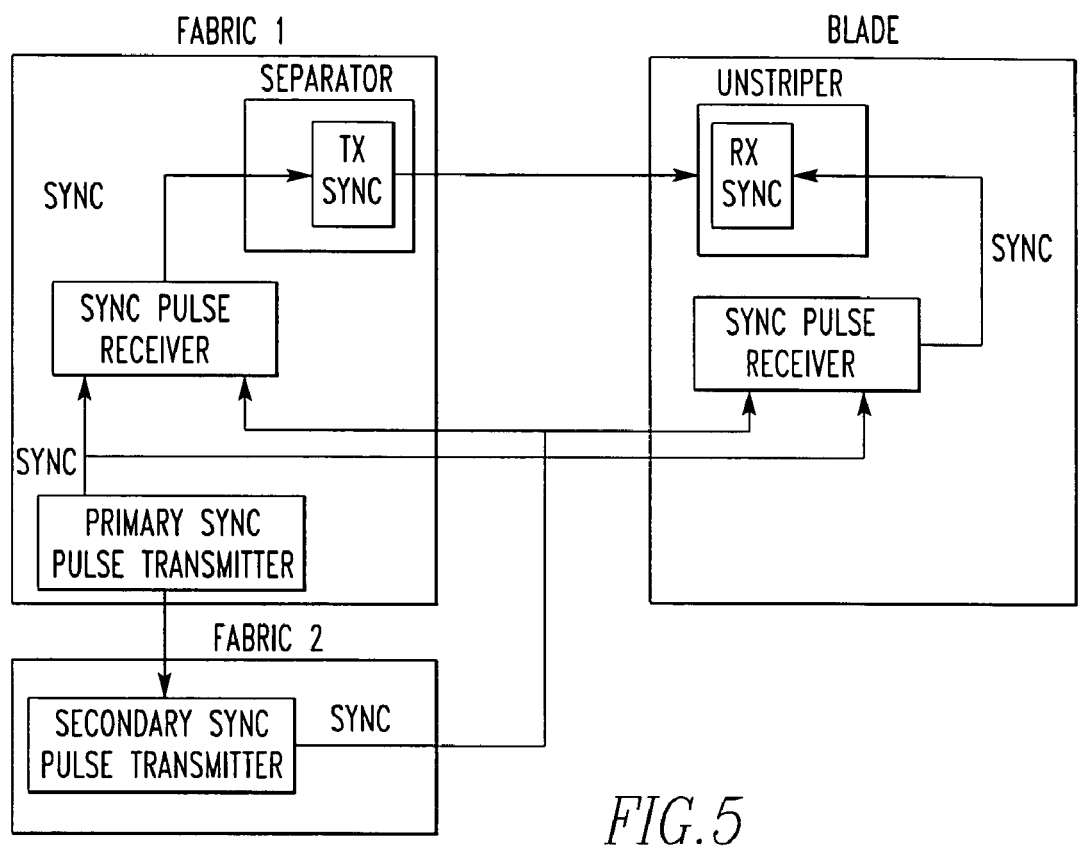
FIG. 5 is a schematic representation of sync pulse distribution.
Figure 6:
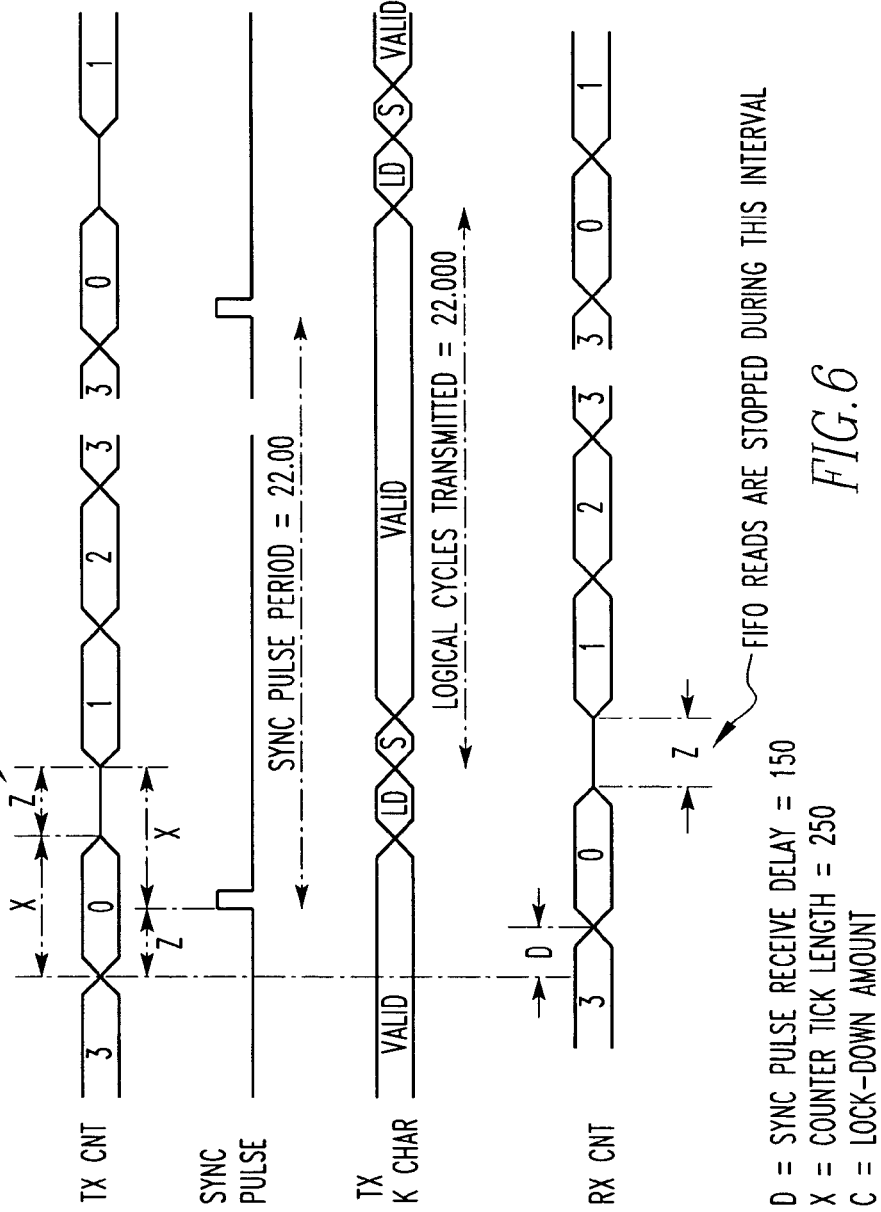
FIG. 6 is a schematic representation regarding the relationship between transmit and receive sequence counters for the separator and unstriper, respectively.

FIG. 5 shows sync pulse distribution.

In order to lockdown the backplane transmission from a fabric by the number of clock cycles indicated in the sync calculation, the entire fabric must effectively freeze for that many clock cycles to ensure that the same enqueuing and dequeueing decisions stay in sync. This requires support in each of the fabric ASICs. Lockdown stops all functionality, including special functions like queue resynch.

The sync signal from the synch pulse receiver is distributed to all ASICs. Each fabric ASIC contains a counter in the core clock domain that counts clock cycles between global sync pulses. After the sync pulse if received, each ASIC calculates the number of clock cycles it is fast.($\delta$). Because the global sync is not transferred with its own clock, the calculated lockdown cycle value may not be the same for all ASICs on the same fabric. This difference is accounted for by keeping all interface FIFOs at a depth where they can tolerate the maximum skew of lockdown counts.

Lockdown cycles on all chips are always inserted at the same logical point relative to the beginning of the last sequence of "useful" (non-lockdown) cycles. That is, every chip will always execute the same number of "useful" cycles between lockdown events, even though the number of lockdown cycles varies.

Lockdown may occur at different times on different chips. All fabric input FIFOs are initially set up such that lockdown can occur on either side of the FIFO first without the FIFO running dry or overflowing. On each chip—chip interface, there is a sync FIFO to account for lockdown cycles (as well as board trace lengths and clock skews). The transmitter signals lockdown while it is locked down. The receiver does not push during indicated cycles, and does not pop during its own lockdown. The FIFO depth will vary depending on which chip locks down first, but the variation is bounded by the maximum number of lockdown cycles. The number of lockdown cycles a particular chip sees during one global sync period may vary, but they will all have the same number of useful cycles. The total number of lockdown cycles each chip on a particular fabric sees will be the same, within a bounded tolerance.

The Aggregator core clock domain completely stops for the lockdown duration—all flops and memory hold their state. Input FIFOs are allowed to build up. Lockdown bus cycles are inserted in the output queues. Exactly when the core lockdown is executed is dictated by when DOUT_AG bus protocol allows lockdown cycles to be inserted. DOUT_AG lockdown cycles are indicated on the DestID bus.

The memory controller must lockdown all flops for the appropriate number of cycles. To reduce impact to the silicon area in the memory controller, a technique called propagated lockdown is used.

The on-fabric chip-to-chip synchronization is executed at every sync pulse. While some sync error detecting capability may exist in some of the ASICs, it is the Unstriper's job to detect fabric synchronization errors and to remove the offending fabric. The chip-to-chip synchronization is a cascaded function that is done before any packet flow is enabled on the fabric. The synchronization flows from the Aggregator to the Memory Controller, to the Separator, and back to the Memory Controller. After the system reset, the Aggregators wait for the first global sync signal. When received, each Aggregator transmits a local sync command (value 0x2) on the DestID bus to each Memory Controller.

The Memory Controllers do not push anything into a DIN input FIFO until the first sync command is seen on that bus. The sync and every bus cycle following is constantly pushed into the input FIFO. On the core side of the input FIFOs, no FIFO is popped until a sync appears in the FIFO from every Aggregator. After two additional margin cycles, every input FIFO is popped every cycle. After this point the input FIFO depths remain constant. The depths are roughly a function of the track delays from each Aggregator. Immediately after the Memory Controllers begin sampling the Aggregator input FIFOs, a sync signal (S_SYNC_L) is transmitted to all Separators on the DOUT and CH_ID busses.

Like the Memory Controllers, the Separators do not push into the DIN and CH_ID busses until a sync signal is received on that bus. The sync and everything after is constantly pushed into the input FIFO.

On the core side the Separator always waits until at least one word is present on all input busses, and then pops the CH_ID and DIN busses simultaneously. This will logically align the data stripes coming from the Memory Controllers. After the first combined sync is popped from the input FIFOs, the Separators send a sync signal on the TOKEN bus to the Memory Controllers.

The striping function assigns bits from incoming data streams to individual fabrics. Two items were optimized in deriving the striping assignment:

1. Backplane efficiency should be optimized for OC48 and OC192.
2. Backplane interconnection should not be significantly altered for OC192 operation.

These were traded off against additional muxing legs for the striper and unstriper ASICs. Irregardless of the optimization, the switch must have the same data format in the memory controller for both OC48 and OC192.

Backplane efficiency requires that minimal padding be added when forming the backplane busses. Given the 12 bit backplane bus for OC48 and the 48 bit backplane bus for OC192, an optimal assignment requires that the number of unused bits for a transfer to be equal to (number_of_bytes*8)/bus_width where "/" is integer division. For OC48, the bus can have 0, 4 or 8 unutilized bits. For OC192 the bus can have 0, 8, 16, 24, 32, or 40 unutilized bits.

This means that no bit can shift between 12 bit boundaries or else OC48 padding will not be optimal for certain packet lengths.

For OC192c, maximum bandwidth utilization means that each striper must receive the same number of bits (which implies bit interleaving into the stripers). When combined with the same backplane interconnection, this implies that in OC192c, each stripe must have exactly the correct number of bits come from each striper which has ¼ of the bits.

For the purpose of assigning data bits to fabrics, a 48 bit frame is used. Inside the striper is a FIFO which is written 32 bits wide at 80–100 MHz and read 24 bits wide at 125 MHz. Three 32 bit words will yield four 24 bit words. Each pair of 24 bit words is treated as a 48 bit frame. The assignments between bits and fabrics depends on the number of fabrics.

TABLE 11

Bit striping function

|  | Fab 0 | Fab 1 | Fab 2 | Fab 3 | Fab 4 | Fab 5 | Fab 6 | Fab 7 | Fab 8 | Fab 9 | Fab 10 | Fab 11 |
|---|---|---|---|---|---|---|---|---|---|---|---|---|
| 1 fab | 0:11<br>12:23<br>24:35<br>36:47<br>0:11 | 0:11<br>12:23<br>24:35<br>36:47<br>0, 2, 5,<br>7, 8, 10 | 1, 3, 4,<br>6, 9, 11 |  |  |  |  |  |  |  |  |  |

TABLE 11-continued

| | | Bit striping function | | | | | | | | | | | |
|---|---|---|---|---|---|---|---|---|---|---|---|---|---|
| | | Fab 0 | Fab 1 | Fab 2 | Fab 3 | Fab 4 | Fab 5 | Fab 6 | Fab 7 | Fab 8 | Fab 9 | Fab 10 | Fab 11 |
| 2 fab | 12:23 | 13, 15, 16, 18, 21 | 12, 14, 17, 19, 20, 22 | | | | | | | | | | |
| | 24:35 | +24 to 0:11 | +24 to 0:11 | | | | | | | | | | |
| | 36:47 | +24 to 12:23 | +24 to 12:23 | | | | | | | | | | |
| 3 fab | 0:11 | 0, 3, 5, 10 | 2, 4, 7, 9 | 1, 6, 8, 11 | | | | | | | | | |
| | 12:23 | 15, 17, 22, 13 | 14, 16, 19, 21 | 13, 18, 20, 23 | | | | | | | | | |
| | 24:35 | +24 to 0:11 | +24 to 0:11 | +24 to 0:11 | | | | | | | | | |
| | 36:47 | +24 to 12:23 | +24 to 12:23 | +24 to 12:23 | | | | | | | | | |
| 4 fab | 0:11 | 0, 5, 10 | 3, 4, 9 | 2, 7, 8 | 1, 6, 11 | | | | | | | | |
| | 12:23 | 15, 16, 21 | 14, 19, 20 | 13, 18, 23 | 12, 17, 22 | | | | | | | | |
| | 24:35 | 26, 31, 32 | 25, 30, 35 | 24, 29, 34 | 27, 28, 33 | | | | | | | | |
| | 36:47 | 37, 42, 47 | 36, 41, 46 | 39, 40, 43 | 38, 43, 44 | | | | | | | | |
| 6 fab | 0:11 | 0,11 | 1, 4 | 5, 8 | 2, 9 | 3, 6 | 7, 10 | | | | | | |
| | 12:23 | 14, 21 | 15, 18 | 19, 22 | 12, 23 | 13, 16 | 17, 20 | | | | | | |
| | 24:35 | +24 to 0:11 | | | | | | | | | | | |
| | 36:47 | +24 to 12:23 | | | | | | | | | | | |
| 12 fab | 0:11 | 0 | 4 | 8 | 1 | 5 | 9 | 2 | 6 | 10 | 3 | 7 | 11 |
| | 12:23 | 15 | 19 | 23 | 12 | 16 | 20 | 13 | 17 | 21 | 14 | 18 | 22 |
| | 24:35 | 26 | 30 | 34 | 27 | 31 | 35 | 24 | 28 | 32 | 25 | 29 | 33 |
| | 36:47 | 37 | 41 | 45 | 38 | 42 | 46 | 39 | 43 | 47 | 37 | 40 | 44 |

The following tables give the byte lanes which are read first in the aggregator and written to first in the separator. The four channels are notated A,B,C,D. The different fabrics have different read/write order of the channels to allow for all busses to be fully utilized.

One Fabric-40 G

The next table gives the interface read order for the aggregator.

| Fabric | 1st | 2nd | 3rd | 4th |
|---|---|---|---|---|
| 0 | A | B | C | D |
| Par | A | B | C | D |

Two Fabric-80 G

| Fabric | 1st | 2nd | 3rd | 4th |
|---|---|---|---|---|
| 0 | A | C | B | D |
| 1 | B | D | A | C |
| Par | A | C | B | D |

120 G

| Fabric | 1st | 2nd | 3rd | 4th |
|---|---|---|---|---|
| 0 | A | D | B | C |
| 1 | C | A | D | B |
| 2 | B | C | A | D |
| Par | A | D | B | C |

Three fabric-160 G

| Fabric | 1st | 2nd | 3rd | 4th |
|---|---|---|---|---|
| 0 | A | B | C | D |
| 1 | D | A | B | C |
| 2 | C | D | A | B |
| 3 | B | C | D | A |
| Par | A | B | C | D |

Siz fabric-240 G

| Fabric | 1st | 2nd | 3rd | 4th |
|---|---|---|---|---|
| 0 | A | D | C | B |
| 1 | B | A | D | C |
| 2 | B | A | D | C |
| 3 | C | B | A | D |
| 4 | D | C | B | A |
| 5 | D | C | B | A |
| Par | A | C | D | B |

Twelve Fabric-480 G

| Fabric | 1st | 2nd | 3rd | 4th |
|---|---|---|---|---|
| 0, 1, 2 | A | D | C | B |
| 3, 4, 5 | B | A | D | C |
| 6, 7, 8 | C | B | A | D |
| 9, 10, 11 | D | C | B | A |
| Par | A | B | C | D |

Interfaces to the gigabit transceivers will utilize the transceiver bus as a split bus with two separate routeword and data busses. The routeword bus will be a fixed size (2 bits for OC48 ingress, 4 bits for OC48 egress, 8 bits for OC192 ingress and 16 bits for OC192 egress), the data bus is a variable sized bus. The transmit order will always have routeword bits at fixed locations. Every striping configuration has one transceiver that it used to talk to a destination in all valid configurations. That transceiver will be used to send both routeword busses and to start sending the data.

The backplane interface is physically implemented using interfaces to the backplane transceivers. The bus for both ingress and egress is viewed as being composed of two halves, each with routeword data. The two bus halves may have information on separate packets if the first bus half ends a packet.

For example, an OC48 interface going to the fabrics locally speaking has 24 data bits and 2 routeword bits. This bus will be utilized acting as if it has 2× (12 bit data bus+1 bit routeword bus). The two bus halves are referred to as A and B. Bus A is the first data, followed by bus B. A packet can start on either bus A or B and end on either bus A or B.

In mapping data bits and routeword bits to transceiver bits, the bus bits are interleaved. This ensures that all transceivers should have the same valid/invalid status, even if the striping amount changes. Routewords should be interpreted with bus A appearing before bus B.

The bus A/Bus B concept closely corresponds to having interfaces between chips.

All backplane busses support fragmentation of data. The protocol used marks the last transfer (via the final segment bit in the routeword). All transfers which are not final segment need to utilize the entire bus width, even if that is not an even number of bytes. Any given packet must be striped to the same number of fabrics for all transfers of that packet. If the striping amount is updated in the striper during transmission of a packet, it will only update the striping at the beginning of the next packet.

Each transmitter on the ASICs will have the following I/O for each channel:
8 bit data bus, 1 bit clock, 1 bit control.
On the receive side, for channel the ASIC receives
a receive clock, 8 bit data bus, 3 bit status bus.

The switch optimizes the transceivers by mapping a transmitter to between 1 and 3 backplane pairs and each receiver with between 1 and 3 backplane pairs. This allows only enough transmitters to support traffic needed in a configuration to be populated on the board while maintaining a complete set of backplane nets. The motivation for this optimization was to reduce the number of transceivers needed.

The optimization was done while still requiring that at any time, two different striping amounts must be supported in the gigabit transceivers. This allows traffic to be enqueued from a striping data to one fabric and a striper striping data to two fabrics at the same time.

Depending on the bus configuration, multiple channels may need to be concatenated together to form one larger bandwidth pipe (any time there is more than one transceiver in a logical connection. Although quad gbit transceivers can tie 4 channels together, this functionality is not used. Instead the receiving ASIC is responsible for synchronizing between the channels from one source. This is done in the same context as the generic synchronization algorithm.

The 8 b/10 b encoding/decoding in the gigabit transceivers allow a number of control events to be sent over the channel. The notation for these control events are K characters and they are numbered based on the encoded 10 bit value. Several of these K characters are used in the chipset. The K characters used and their functions are given in the table below.

TABLE 12

K Character usage

| K character | Function | Notes |
| --- | --- | --- |
| 28.0 | Sync indication | Transmitted after lockdown cycles, treated as the prime synchronization event at the receivers |
| 28.1 | Lockdown | Transmitted during lockdown cycles on the backplane |
| 28.2 | Packet Abort | Transmitted to indicate the card is unable to finish the current packet. Current use is limited to a port card being pulled while transmitting traffic |
| 28.3' | Resync window | Transmitted by the striper at the start of a synch window if a resynch will be contained in the current sync window |
| 28.4 | BP set | Transmitted by the striper if the bus is currently idle and the value of the bp bit must be set. |
| 28.5 | Idle | Indicates idle condition |
| 28.6 | BP clr | Transmitted by the striper if the bus is currently idle and the bp bit must be cleared. |

The switch has a variable number of data bits supported to each backplane channel depending on the striping configuration for a packet. Within a set of transceivers, data is filled in the following order:
F[fabric]__[oc192 port number][oc48 port designation (a,b, c,d)][transceiver__number]

The chipset implements certain functions which are described here. Most of the functions mentioned here have support in multiple ASICs, so documenting them on an ASIC by ASIC basis does not give a clear understanding of the full scope of the functions required.

The switch chipset is architected to work with packets up to 64K+6 bytes long. On the ingress side of the switch, there are busses which are shared between multiple ports. For most packets, they are transmitted without any break from the start of packet to end of packet. However, this approach can lead to large delay variations for delay sensitive traffic. To allow delay sensitive traffic and long traffic to coexist on the same switch fabric, the concept of long packets is introduced. Basically long packets allow chunks of data to be sent to the queueing location, built up at the queueing location on a source basis and then added into the queue all at once when the end of the long packet is transferred. The definition of a long packet is based on the number of bits on each fabric.

If the switch is running in an environment where Ethernet MTU is maintained throughout the network, long packets will not be seen in a switch greater than 40 G in size.

A wide cache-line shared memory technique is used to store cells/packets in the port/priority queues. The shared memory stores cells/packets continuously so that there is virtually no fragmentation and bandwidth waste in the shared memory.

There exists multiple queues in the shared memory. They are per-destination and priority based. All cells/packets which have the same output priority and blade/channel ID are stored in the same queue. Cells are always dequeued from the head of the list and enqueued into the tail of the queue. Each cell/packet consists of a portion of the egress route word, a packet length, and variable-length packet data.

Cell and packets are stored continuously, i.e., the memory controller itself does not recognize the boundaries of cells/packets for the unicast connections. The packet length is stored for MC packets.

The multicast port mask memory 64K×16-bit is used to store the destination port mask for the multicast connections, one entry (or multiple entries) per multicast VC. The port masks of the head multicast connections indicated by the multicast DestID FIFOs are stored internally for the scheduling reference. The port mask memory is retrieved when the port mask of head connection is cleaned and a new head connection is provided.

APS stands for a Automatic Protection Switching, which is a SONET redundancy standard. To support APS feature in the switch, two output ports on two different port cards send roughly the same traffic. The memory controllers maintain one set of queues for an APS port and send duplicate data to both output ports.

To support data duplication in the memory controller ASIC, each one of multiple unicast queues has a programmable APS bit. If the APS bit is set to one, a packet is dequeued to both output ports. If the APS bit is set to zero for a port, the unicast queue operates at the normal mode. If a port is configured as an APS slave, then it will read from the queues of the APS master port. For OC48 ports, the APS port is always on the same OC48 port on the adjacent port card.

The shared memory queues in the memory controllers among the fabrics might be out of sync (i.e., same queues among different memory controller ASICs have different depths) due to clock drifts or a newly inserted fabric. It is important to bring the fabric queues to the valid and sync states from any arbitrary states. It is also desirable not to drop cells for any recovery mechanism.

A resync cell is broadcast to all fabrics (new and existing) to enter the resync state. Fabrics will attempt to drain all of the traffic received before the resynch cell before queue resynch ends, but no traffic received after the resynch cell is drained until queue resynch ends. A queue resynch ends when one of two events happens:

1. A timer expires.
2. The amount of new traffic (traffic received after the resynch cell) exceeds a threshold.

At the end of queue resynch, all memory controllers will flush any left-over old traffic (traffic received before the queue resynch cell). The freeing operation is fast enough to guarantee that all memory controllers can fill all of memory no matter when the resynch state was entered.

Queue resynch impacts all 3 fabric ASICs. The aggregators must ensure that the FIFOs drain identically after a queue resynch cell. The memory controllers implement the queueing and dropping. The separators need to handle memory controllers dropping traffic and resetting the length parsing state machines when this happens. For details on support of queue resynch in individual ASICs, refer to the chip ADSs.

For the dequeue side, multicast connections have independent 32 tokens per port, each worth up 50-bit data or a complete packet. The head connection and its port mask of a higher priority queue is read out from the connection FIFO and the port mask memory every cycle. A complete packet is isolated from the multicast cache line based on the length field of the head connection. The head packet is sent to all its destination ports. The 8 queue drainers transmit the packet to the separators when there are non-zero multicast tokens are available for the ports. Next head connection will be processed only when the current head packet is sent out to all its ports.

Queue structure can be changed on fly through the fabric resync cell where the number of priority per port field is used to indicate how many priority queues each port has.

The following words have reasonably specific meanings in the vocabulary of the switch. Many are mentioned elsewhere, but this is an attempt to bring them together in one place with definitions.

TABLE 23

| Word | Meaning |
|---|---|
| APS | Automatic Protection Switching. A sonet/sdh standard for implementing redundancy on physical links. For the switch, APS is used to also recover from any detected port card failures. |
| Backplane synch | A generic term referring either to the general process the the switch boards use to account for varying transport delays between boards and clock drift or to the logic which implements the TX/RX functionality required for the the switch ASICs to account for varying transport delays and clock drifts. |
| BIB | The switch input bus. The bus which is used to pass data to the striper(s). See also BOB |
| Blade | Another term used for a port card. References to blades should have been eliminated from this document, but some may persist. |
| BOB | The switch output bus. The output bus from the striper which connects to the egress memory controller. See also BIB. |
| Egress Routeword | This is the routeword which is supplied to the chip after the unstriper. From an internal chipset perspective, the egress routeword is treated as data. See also fabric routeword. |
| Fabric Routeword | Routeword used by the fabric to determine the output queue. This routeword is not passed outside the unstriper. A significant portion of this routeword is blown away in the fabrics. |
| Freeze | Having logic maintain its values during lock-down cycles. |
| Lock-down | Period of time where the fabric effectively stops performing any work to compensate for clock drift. If the backplane synchronization logic determines that a fabric is 8 clock cycles fast, the fabric will lock down for 8 clocks. |
| Queue Resynch | A queue resynch is a series of steps executed to ensure that the logical state of all fabric queues for all ports is identical at one logical point in time. Queue resynch is not tied to backplane resynch (including lock-down) in any fashion, except that a lock-down can occur during a queue resynch. |
| SIB | Striped input bus. A largely obsolete term used to describe the output bus from the striper and input bus to the aggregator. |
| SOB | One of two meanings. The first is striped output bus, which is the output bus of the fabric and the input bus of the agg. See also SIB. The second meaning is a generic term used to describe engineers who left Marconi to form/work for a start-up after starting the switch design. |
| Sync | Depends heavily on context. Related terms are queue resynch, lock-down, freeze, and backplane sync. |
| Wacking | The implicit bit steering which occurs in the OC192 ingress stage since data is bit interleaved among stripers. This bit steering is reversed by the aggregators. |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch for switching packets in a network comprising:
    a plurality of port cards which send packets to and receive packets from the network; and
    a plurality of fabrics connected to the port cards for switching portions of a packet as stripes and a parity stripe from which the packet is reconstructed with the parity stripe providing for error detection and correction, each fabric having a plurality of queues in which portions of the packet as stripes are stored, each queue corresponding to one of the port cards, each fabric having a determining mechanism which determines which queue the portions of the packet as stripes should be placed in, the determining mechanism is dynamic to reflect changes in the port card quantity without any change in connection data of the packet.

2. A switch as described in claim 1 wherein each fabric has a memory controller having the queues and the determining mechanism.

3. A switch as described in claim 2 wherein the determining mechanism includes an input lookup which identifies in which queue portions of the packet are placed.

4. A switch as described in claim 3 wherein the input lookup identifies more queues than are present in the switch.

5. A switch as described in claim 4 wherein each fabric identifies which queues correspond to which output ports from a first signal it receives from the network.

6. A switch as described in claim 5 wherein the input lookup has a 10-bit field.

7. A switch as described in claim 6 wherein each fabric receives a second signal which identifies which bits of the 10-bit field are to be used to identify the queue the portions of the packet are to be stored in.

8. A switch as described in claim 7 wherein the second signal has a 2-bit field which indicate which 8 of the 10 bits of the input lookup are to be used to identify the queue the portions of the packet are to be stored in.

9. A switch as described in claim 6 wherein the 10-bit field comprises bits 0–7 which identifies the output port to which the queue connects and bits 8 and 9 identifies a priority of the portions of the packet.

10. A switch as described in claim 6 wherein the 8 bits of the 10 bits can be either bits 0–5, 8 and 9 which are 4 priorities on up to 64 output ports, or bits 0–6 and 8 which are 2 priorities up to 128 output ports, or bits 0–7 which are 1 priority up to 256 output ports.

11. A switch as described in claim 10 wherein each fabric has an aggregator which receives portions of packets as stripes and connects to the memory controller, and a separator which connects to the memory controller and sends portions of the packets as stripes to the port cards.

12. A switch as described in claim 11 wherein the port card includes a striper which sends portions of packets as stripes to the aggregator of each fabric, and an unstriper which receives portions of packets as stripes from the separator of each fabric.

13. A method for switching packets in a network comprising the steps of:
    receiving packets at a plurality of port cards of a switch from the network;
    sending portions of the packets as stripes to a respective number of fabrics of the switch;
    storing the respective portions of packets in a plurality of queues of one fabric of the number of fabrics corresponding to port cards the portions of the packets are to be sent to by the respective fabrics;
    sending the portions of packets as stripes to the port cards;
    transmitting packets from the port cards to the network;
    changing the number of port cards in the switch;
    receiving additional packets at the port cards;
    sending portions of the additional packets to the number of the fabrics after the number of the port cards has changed; and
    storing the portions of the additional packets in the queues corresponding to the port cards the portions of the packets are to be sent to without any change to connection data in the packets.

14. A method as described in claim 13 wherein the storing the respective portions step includes a step of looking up in an input lookup, which identifies in which queue portions of the packets are placed, which queue the portions of the packets are to be placed.

15. A method as described in claim 14 including after the changing step, there is a step of receiving a first signal which identifies in which queues portions of the packets are to be placed.

16. A method as described in claim 15 including after the receiving the first signal step, there is a step of receiving a second signal which identifies which bits of a 10-bit field of the input lookup are to be used to identify the queue the portions of the packet are to be stored in.

17. A method as described in claim 16 wherein the receiving the second signal step includes a step of reviewing a 2-bit field of the second signal which indicate which 8 of the 10 bits of the input lookup are to be used to identify the queue the portions of the packets are to be stored in.

18. A method as described in claim 17 wherein each fabric has a memory controller having the queues and the sending portions of packets step includes a step of sending the stripes to an aggregator of each fabric which receives portions of packets and connects to the memory controller.

19. A method as described in claim 18 wherein the sending portions of packets step includes a step of sending with a separator of the fabric which connects to the memory controller portions of the packets as stripes to the port cards.

20. A method as described in claim 19 wherein the sending the stripes to an aggregator step includes a step of sending with a striper portions of packets as stripes to the aggregator of each fabric.

21. A method as described in claim 20 wherein after the sending with the separator step, there is a step of receiving the stripes from the separator of each fabric at an unstriper of each port card.

* * * * *

UNITED STATES PATENT AND TRADEMARK OFFICE
CERTIFICATE OF CORRECTION

PATENT NO. : 6,973,092 B1  
APPLICATION NO. : 09/628059  
DATED : December 6, 2005  
INVENTOR(S) : Zhou et al.

Page 1 of 1

It is certified that error appears in the above-identified patent and that said Letters Patent is hereby corrected as shown below:

On the Title Page, (*)Notice delete "633" and insert -- 753 --, therefor.

In Column 11, Line 3, delete "fast.(δ)." and insert -- fast. --, therefor.

Signed and Sealed this

Eleventh Day of November, 2008

JON W. DUDAS  
*Director of the United States Patent and Trademark Office*